United States Patent [19]

Wilmot

[11] 4,044,352
[45] Aug. 23, 1977

[54] SIGNAL PROCESSOR

[75] Inventor: Richard D. Wilmot, Buena Park, Calif.

[73] Assignee: Hughes Aircraft Company, Culver City, Calif.

[21] Appl. No.: 535,869

[22] Filed: Dec. 23, 1974

[51] Int. Cl.² ............................................. G01S 9/02
[52] U.S. Cl. ............................................. 343/5 VQ
[58] Field of Search ........................... 343/5 DP, 5 VQ

[56] References Cited
U.S. PATENT DOCUMENTS

| 3,149,333 | 9/1964 | Campbell | 343/17.1 R |
| 3,162,852 | 12/1964 | Altovsky et al. | 343/17.1 R |
| 3,353,177 | 11/1967 | Wilmot | 343/5 DP |
| 3,438,034 | 4/1969 | Carre et al. | 343/17.1 R |
| 3,531,802 | 9/1970 | Brown et al. | 343/17.1 R |
| 3,718,927 | 2/1973 | Howard et al. | 343/5 DP X |
| 3,946,382 | 3/1976 | Kossiakoff et al. | 343/5 VQ |

*Primary Examiner*—Malcolm F. Hubler

*Attorney, Agent, or Firm*—Walter J. Adam; William H. MacAllister, Jr.

[57] ABSTRACT

This invention relates to an improved signal processor that is insensitive to the type of clutter that is encountered by utilizing multiple parallel range sample intervals which vary in length from minimum to maximum so that the optimum sample size is provided for clutter or different range extents. By utilizing the correct range sample interval for the clutter, the detection threshold is accurately set as a result of an improved sample mean. The detection system includes a plurality of mean level processors operating in parallel in response to signal samples varying from minimum to maximum length in range and a selection circuit that selects the largest amplitude value of the clutter signal for use as the mean value in a signal comparator. When the mean value is the same for two or more sample sizes, one arrangement in accordance with the invention utilizes the larger sample size as the mean value.

8 Claims, 7 Drawing Figures

4,044,352

1

SIGNAL PROCESSOR

BACKGROUND OF THE INVENTION

1. Field of the Invention

This invention relates to radar processor systems and more particularly an improved mean level detection system that is substantially insensitive to the type of clutter that is encountered.

2. Description of the Prior Art

Conventional radar systems utilize adaptive thresholding devices such as mean level detectors which use a fixed sample size in range to provide an estimate of the clutter amplitude for determining the mean level detection threshold. Because clutter varies considerably in the length of its range extent, a system utilizing a fixed sample size will result in a sample that in most cases will either be too small and produce a poor estimate of the means and will be in error and provide a high threshold level or will be too large and will be in error because the sample contains clutter and noise which reduces the threshold level below the mean value of the clutter amplitude. If the threshold level is too high, a number of valid signals may not be detected and if the threshold level is too low the system has an undesirably high false alarm rate. Thus, in some types of radar systems a detection system would be desirable that does not have the mean detection level determined by a fixed sample size of the clutter in range.

SUMMARY OF THE INVENTION

The improved mean level detector in accordance with principles of the invention provides clutter processing and detection for a radar data extractor that is insensitive to the type of clutter that is encountered by utilizing optimum clutter sampling intervals. Because clutter varies considerably in the length of its range extent, the system of the invention utilizes a variable sample size in the range dimension varying from minimum to maximum length in range and selecting the sample with the largest mean value for the threshold. The system in accordance with the invention utilizes a set of parallel samples with different length in range respectively applied to parallel processors for determining a plurality of mean levels. A comparator circuit then selects, for both early and late clutter for some arrangements in accordance with the invention, the mean level having the largest amplitude or if the largest amplitude is equal between more than one mean levels processor, selects among those detectors providing the largest amplitude, the processor receiving the sample having the longest range interval. This selected mean level is then utilized as the threshold to be compared with the received video signal. In the arrangements in accordance with the invention selecting the largest mean amplitude for both early and late clutter, the larger or larger mean levels for both the early and late clutter are compared to determine the largest mean level between clutter derived from entering a range area and leaving a range area.

It is thus an object of this invention to provide a signal processor that reliably operates in the presence of clutter.

It is a further object of this invention to provide a clutter processor that is insensitive to the type of clutter that is encountered in a radar environment.

It is another object of this invention to provide a detection system that provides a substantially constant false alarm rate in the presence of a clutter atmosphere.

It is a still further object of this invention to provide an improved mean level detection system.

BRIEF DESCRIPTION OF THE DRAWINGS

The novel features of this invention as well as the invention itself, both as to its method of organization and method of operation, will be best understood from the accompanying description, taken in connection with accompanying drawings, in which like reference characters refer to like parts, and in which.

DESCRIPTION OF THE PREFERRED EMBODIMENT

Figure 1:
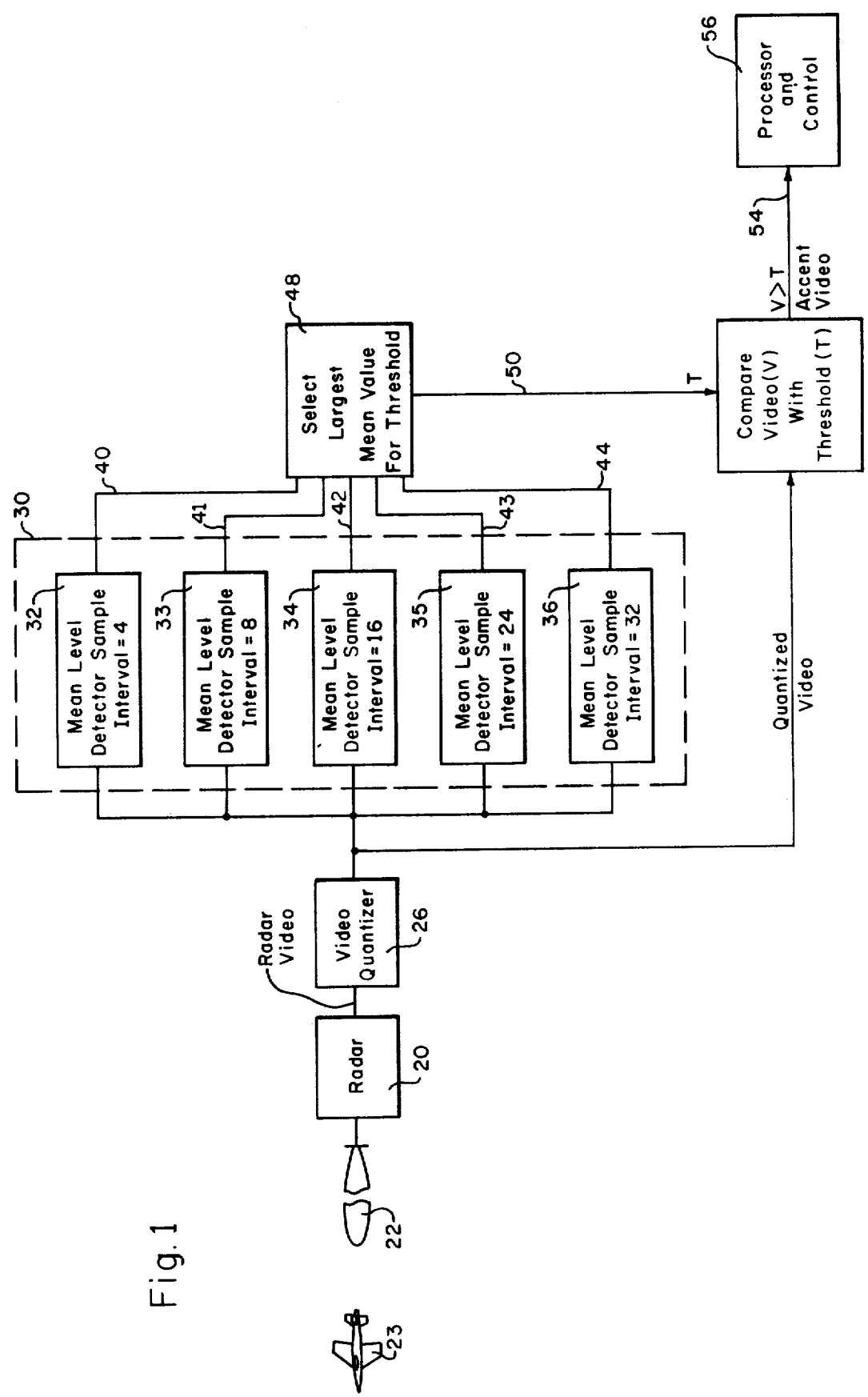
FIG. 1 is a schematic block diagram of the adaptive clutter processor in accordance with the invention.

Referring first to the block diagram of FIG. 1 the adaptive processor and detector system in accordance with the invention responds to a source of video signals such as a radar system 20 which may be of any suitable type transmitting energy into space over a plurality of range intervals and receiving return energy from targets or other objects such as 23. The transmission and reception is provided by a suitable antenna having a lobe pattern such as shown at 22. It is to be noted that although the concepts of the invention are illustrated as operating in a radar system, the principles of the invention are equally applicable to laser systems, sonar systems infrared systems or any type of system in which clutter or adverse atmospheric conditions are present during signal processing. The radar video signal is then passed from the radar system 20 into a video quantizer or analog to digital (A/D) converter 26 to provide a quantized digital signal on a lead 28 representative of the target amplitude. Video quantizers or A/D converters are well known in the art and any suitable type may be utilized. It is to be understood that the principles of the invention are not limited to any particular radar and video quantizer arrangement or to operation in response to video signals but may operate in response to analog video utilizing analog type processing circuits. The digital video signal on the lead 28 is applied to a mean level detector unit 30 which in one arrangement in accordance with the invention, includes mean level detectors 32, 33, 34, 35 and 36 having respective sample intervals of 4, 8, 16, 24 and 32 range bins. The detected mean level is then applied from the mean level detectors 32 to 36 to respective leads 40 to 44 and in turn to a selection circuit 48 that selects the largest mean value for the threshold to be utilized for signal detection. The selected threshold level T is then applied through a lead 50 to a comparison circuit 52 also receiving the quantized on time video signal V and passing the video signal to an output lead 54 when the video V is greater than the threshold level T. The video signal on the lead 54 is then applied to radar system utilization circuit such as a processing and control unit 56.

Figure 2:
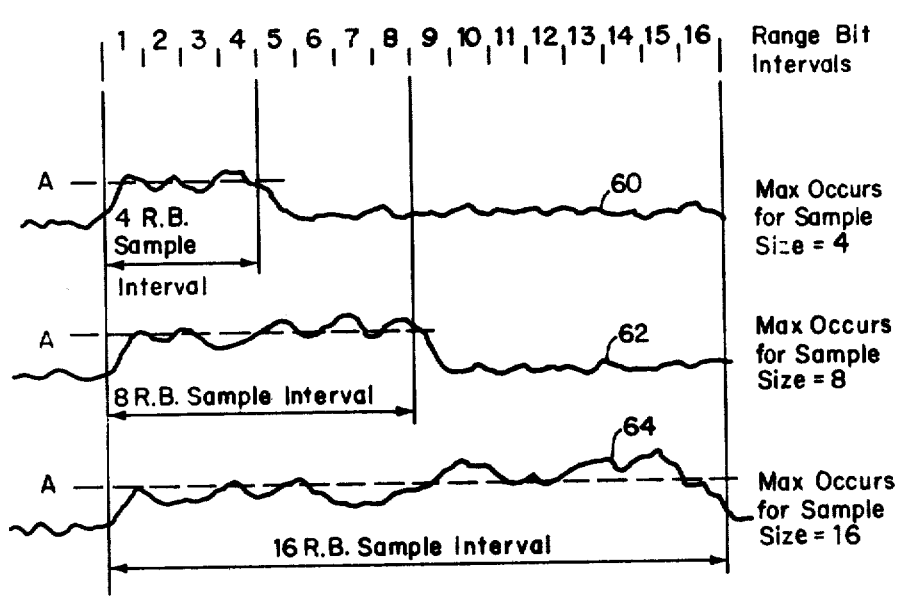
FIG. 2 is a schematic diagram showing waveforms of time versus video amplitude to illustrate an example of solid clutter pattern processing.

Referring now to FIG. 2 which shows an example of non-stationary clutter extending over different lengths of range of waveform 60, 62 and 64 in which the maximum mean level value A occurs for respective sample sizes 4, 8, and 16 range bins. It has been found that the correct value of the mean amplitude is obtained when the sample size is equal in length to the clutter range extent, and the correct sample size is selected by using the sample size which has the maximum value for mean amplitude A. For clutter extending over 4 range bins with a mean amplitude of A, the mean values for sample sizes of 4, 8 and 16 are respectively (4A/4), (4A/8), and (4A/16) or A, (A/2) and (A/4). For this condition of the waveform 60, the correct sample size is 4 and this sample size has a maximum signal amplitude value because the other samples include low amplitude noise as well as clutter which causes their mean value to be lower. For a clutter condition of length of 8 range bins as illustrated by the waveform 62, the maximum mean value occurs for a sample size of 8 range bins and for clutter of a length of 16 range bins illustrated by the waveform 64, the maximum mean value occurs for a sample size of 16 range bins. It is to be noted that the shorter sample sizes could have a mean value equal to the larger sample sizes if the clutter amplitude was constant. In some systems in accordance with the invention any of the largest equal amplitude sample sizes may be used for the mean value since the mean levels are the same. However for improved accuracy of the mean level signal, the sample having the longest range bin interval may be utilized.

Figure 3:
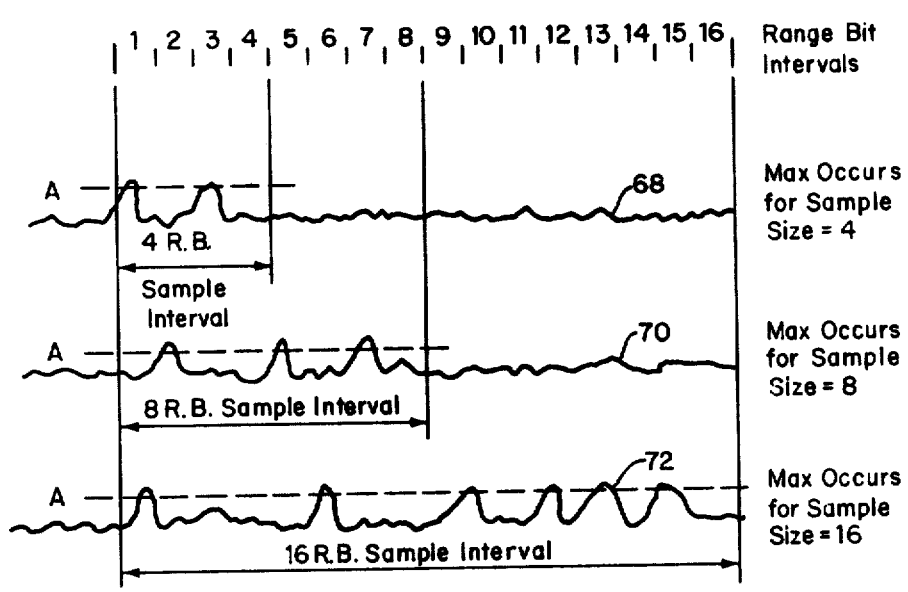
FIG. 3 is a schematic diagram showing waveforms of amplitude as a function of time for explaining an example of broken clutter pattern processing.

Referring now to FIG. 3 which is an example of broken clutter pattern processing, signals of waveforms 68, 70 and 72 are shown each having clutter patterns that are broken up instead of being solid or continuous in range. It may be noted that this broken up clutter pattern is characteristic of MTI clutter residue and pulse compression video. The first example of the waveform 68 has mean levels of (2A/4), (2A/8), and (2A/16) for respective sample sizes of 4, 8, and 16 respectively. The second example of the waveform 70 has mean values of (1A/4), (3A/8), and (3A/16) for respective sample sizes of 4, 8 and 16 range bins. The third example of the waveform 72 has mean values (1A/4), (2A/8), and (6A/16) for respective sample sizes of 4, 8 and 16 range bins. Thus, a maximum mean value occurs when the sample interval is equal to the length of the clutter for each of the examples. It can be seen that the selection of the sample size with the largest mean value provides a correct sample size for the clutter processing where the clutter is continuous or broken up. The examples also illustrate the large errors that may occur if a single fixed length sample size is utilized. If a sample size of 8 has been used in all three cases shown in FIG. 3, the mean would have been 50% too small for the first case of the waveform 68, correct for the second case of the waveform 70 and 66% too small for the third case of the waveform 72. Therefore it is necessary to use the correct sample interval to obtain the highly accurate value of the clutter and signal mean amplitude for detection purposes.

Figure 4A:
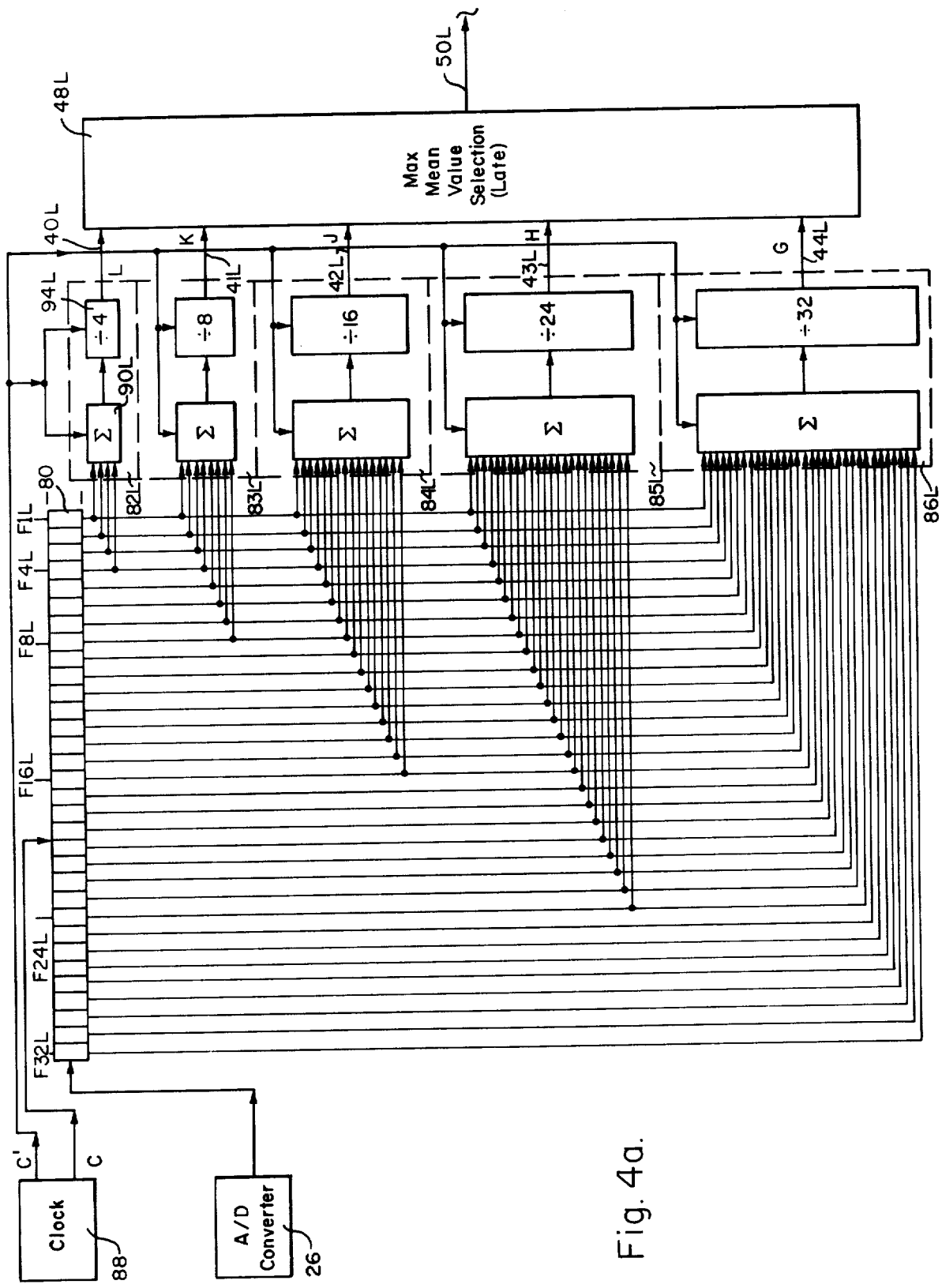
FIGS. 4a and 4b are a schematic block diagram of an example of the adaptive processing and detecting system of FIG. 1 in accordance with the invention.
Figure 4B:
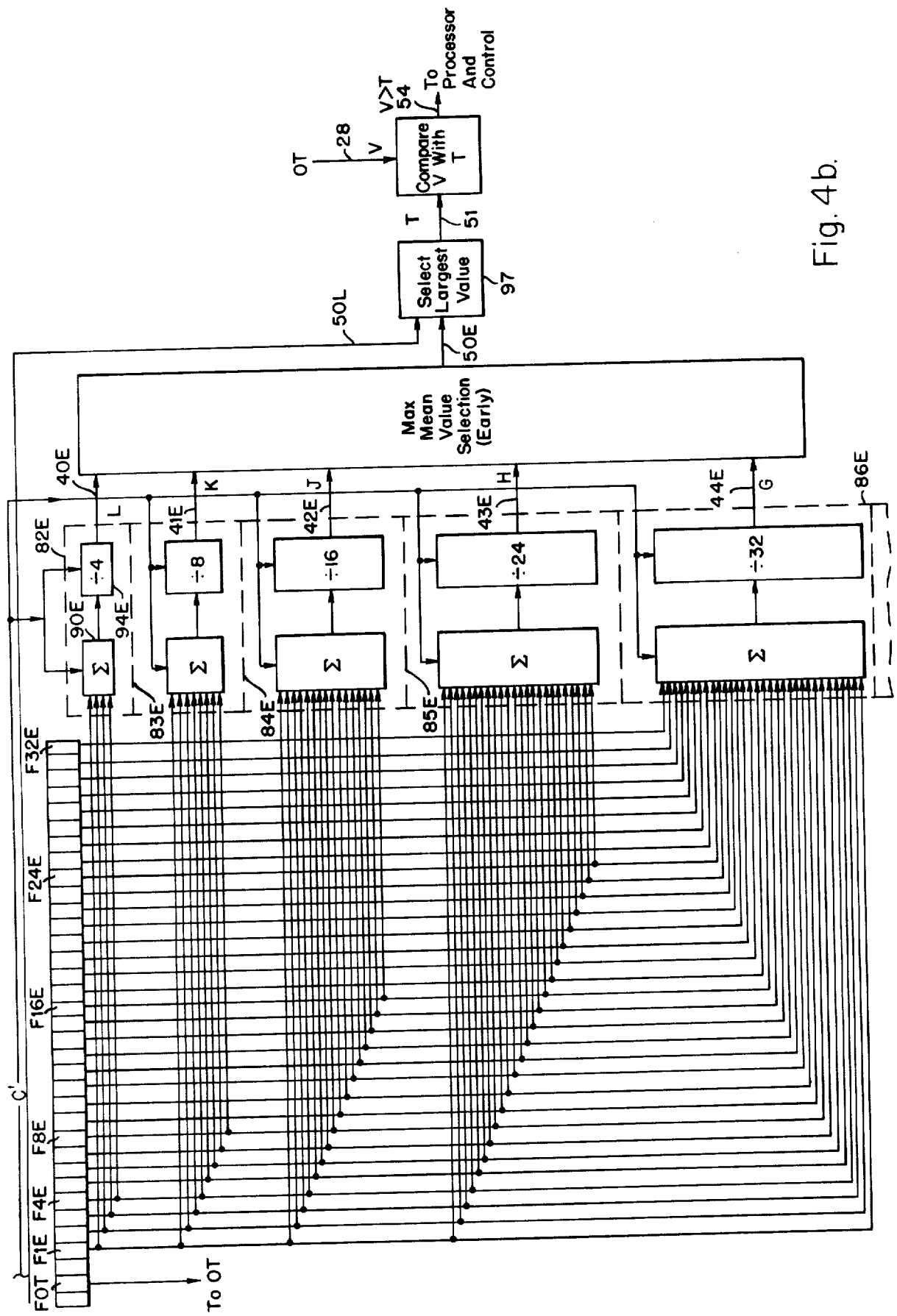

Referring now to FIGS. 4a and 4b, which show one arrangement of the detector system in accordance with the invention, the video signal from the A/D converter 26 is applied to a shift register 80 included in the mean level detector unit 30. In the illustrated arrangement of FIGS. 4a and 4b all of the mean level detectors 82 to 86 which may be identical to each other except for the sample interval factor, operate in response to a single shift register 80. However it is to be understood that in other arrangements in accordance with the invention, each detector may have its own storage unit or a high speed detection arrangement may be provided operating in a serial fashion in response to the samples provided either from a single storage unit or from a plurality of storage units.

The illustrated shift register 80 contains 67 storage elements which may be flip-flops. Each flip-flop element may contain one or more individual flip-flops. For example if the A/D converter provided a 4 bit output, each storage element would contain 4 individual flip-flops.

There are 67 storage elements in shift register 80 for: 32 samples of early clutter, 32 samples of late clutter, the on-time sample, and a guard sample before and one after the on-time sample. Approaching a clutter area, the early samples will contain the clutter; leaving a clutter area, the late samples will contain the clutter. The time position between FIL and FIE (the OT flip-flop) is the reference point between early and late clutter. The discussion of FIGS. 4a and 4b refer to both early and late samples which are identified as E and L suffixes on FIGS. 4a and 4b. The unit numbers which are the same except for the suffix E and L are identical except that the sample time is early or late.

The digital video signal is applied through the shift register 80 in response to clock pulses C from a clock 88 which for example may have or provide a clock signal for defining each range bin interval so that the on time (OT) video on the lead 28 is compared in the comparator 52 during the occurence of each range bin interval. Each mean level detector such as 82 may include a digital summing or adding circuit 90 with its output coupled to a division circuit 94 to provide a mean level signal on the lead 40. Summing circuits such as 90 of the mean level detector 82 respectively sum for the mean level detectors 82 to 86: 4 video signals from the flip-flops F1 to F4, 8 video signals from the flip-flops F1 to F8, 16 video signals from the flip-flops, F1 to F16, 24 video signals from the flip-flops F1 to F24, and 32 video signals from the flip-flops F1 to F32, which respective signals are applied to division circuits of mean level detectors 82 to 86. For both the early E and late L mean level detectors, summed signals of the detectors 82 to 86 are respectively divided by 4, 8, 16, 24 and 32 to apply the mean level signals L, K, J, H and G to respective leads 40 to 44. In order to illustrate that the principles of the invention are not limited to any particular number of mean level detectors a dotted mean level detector 96 is included.

The mean level signals on the leads 40 to 44 are then applied to the maximum mean value selection circuits 48L and 48E receiving a clock signal C' which is typically 8 times as fast as C to allow the mean values to be computed and compared and selected during each range bin. The mean value selection circuits 48L and 48E then select the signal having the maximum value or in some arrangements in accordance with the invention when the maximum and substantially the same value is from one or more mean level detectors, the signal from the detector having the longest sample interval is selected.

The maximum mean value of early samples 50E and the maximum mean value of the late samples 50L are compared in selection circuit 97 which gates out the largest value 50 to the comparator 52. The larger selected mean value signal T is then applied through the lead 51 to be compared with the on-time signal also indicated as the value V. The compare circuit 52 may be any suitable arrangement with the digital comparator circuit responding to two input signals to provide an output of one signal when that signal is larger than the signal V. Comparison circuits are well known in the art such as part No. TDL/MS19324 which is a 5 bit comparator providing an output pulse and listed in the Fairchild Semiconductor Catalog of June, 1972 on page 8-124. Other arrangements in accordance with the invention may operate to pass the signal amplitude V in response to a proper comparison.

The operation may be described mathematically as follows:

$V = V$ For $(V - T) > 0$
$V = O$ For $(V - T) \leq 0$ where $T$ is given by $T = $ Max (M.V.4, M.V.8, M.V.16, M.V.24, M.V.32)

where $M.V.N. = \dfrac{\sum_{i=1}^{N} Video}{N}$ with $N$ being the sample size which is 4, 8, 16, 24, or 32 in the illustrated system.

The use of the optimum sample intervals in accordance with the invention insures that the true mean value will be calculated and that the correct threshold will be established to control the clutter false target rate.

Figure 5:
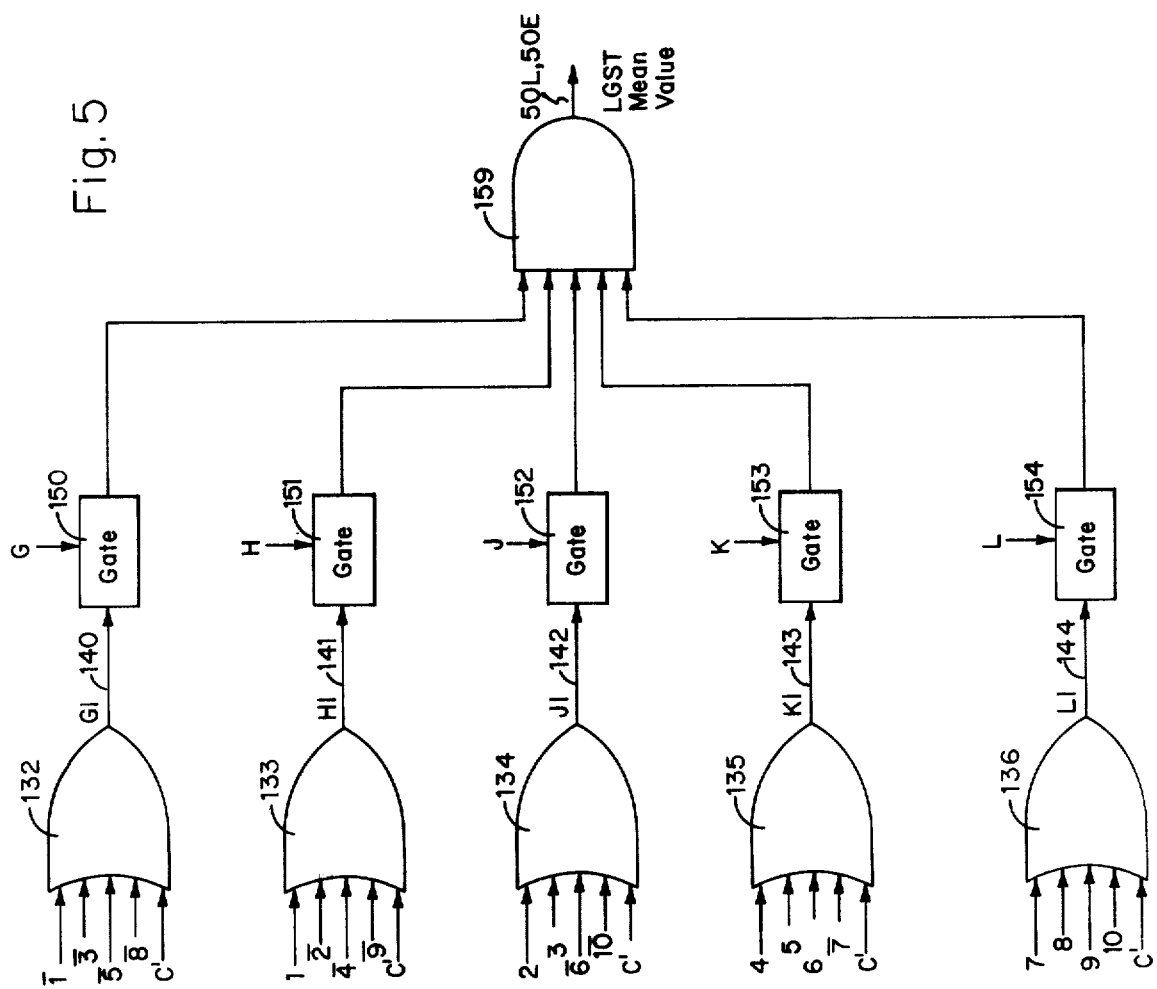
FIG. 5 is a schematic block diagram illustrating a maximum mean value selection circuit that may be utilized in the systems of FIG. 1 and FIGS. 4a and 4b.
Figure 5:
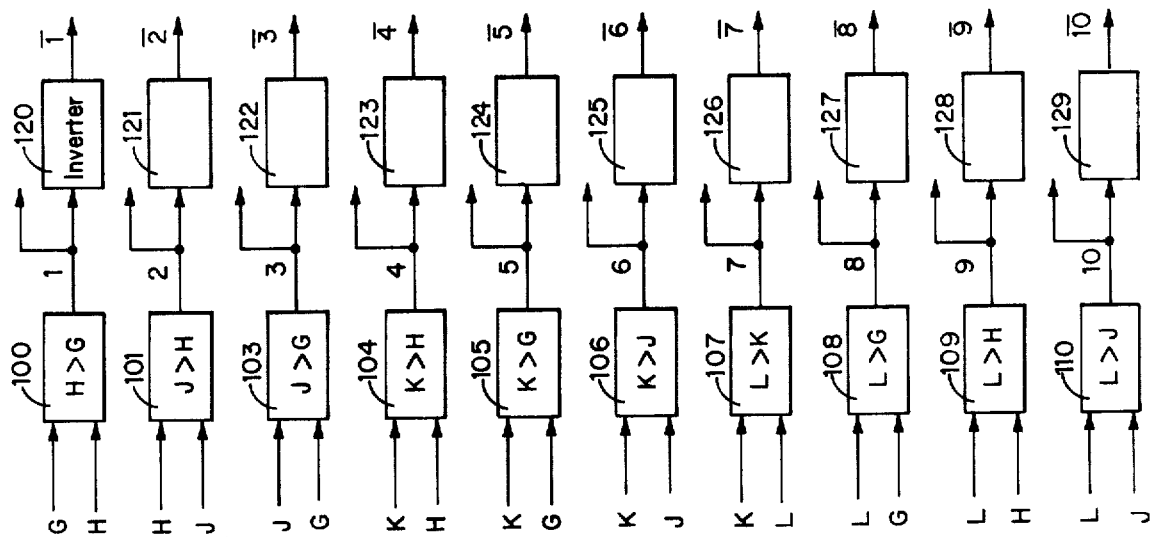
Figure 6:
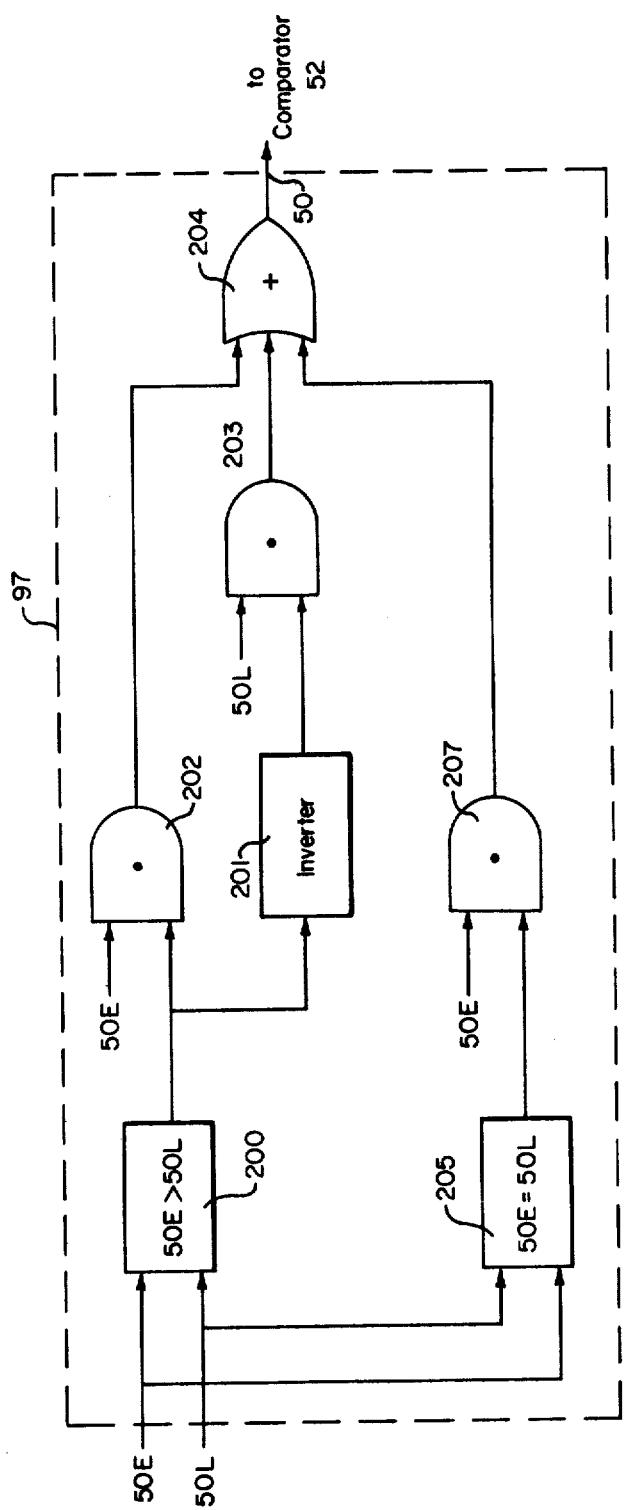
FIG. 6 is a schematic diagram of the largest value selection circuit that may be utilized in the system of FIGS. 4a and 4b.

Referring now to FIG. 5 which illustrates a maximum mean value selection circuit 48L and 48E responding to the signals L, K, J, H and G, comparators 100 to 110 are provided respectively responsive to signals G and H, H and J, J and G, K and H, K and G, K and J, K and L, L and G, L and H and L and J to provide respective signals 1 to 10. Converters 120 to 129 are also provided respectively coupled to comparators 100 to 110 to provide the inverse of signals 1 to 10. The comparators 100 to 110 may be conventional units to provide a positive or one output when a first input signal is larger than the second input and to provide a zero or negative output when the second signal is equal to or less than the first signal. The selection circuit 48 includes AND gates 132 to 136 respectively receiving signals $\overline{1}, \overline{3}, \overline{5}, \overline{8}$, signals 1, $\overline{2}, \overline{4}, \overline{9}$, signals 2, 3, $\overline{6}, \overline{10}$, signals 4, 5, 6, $\overline{7}$, and signals 7, 8, 9 and 10 to provide upon coincidence of the input signals, positive or 1 signals G1, H1, J1, K1 and L1 on respective leads 140 to 144. Gates 150 to 154 are provided to gate through respective signals G, H, J, K and L and in response to respective signals G1, H1, J1, K1 and L1. The gated signals are applied to an OR gate 159 which passes apply the largest mean value, or when there are several largest mean values the mean value from the detector having the longest time interval, to the lead 50, 50L or 50E for the respective late and early clutter determinations. The expressions with the signals at the output of the AND gates are as follows:

$G1 \; \overline{H > G} \cdot \overline{J > G} \cdot \overline{K > G} \cdot \overline{L > G}$
$H1 = H > G \cdot \overline{H > J} \cdot \overline{K > H} \cdot \overline{L > H}$
$J1 = J > H \cdot J > G \cdot \overline{K > J} \cdot \overline{L > J}$
$K1 = K > H \cdot K > G \cdot K > J \cdot \overline{L > K}$
$L1 = L > K \cdot L > G \cdot L > H \cdot L > J$ The selector unit 97 of FIG. 6 selects the bigger of the early and late maximum mean values. FIG. 6 shows the early and late values being compared in a comparator 200 which provides a true output for the early sample exceeding the late sample. When this occurs, the AND gate 202 gates the early value through to the OR gate 204. When the early value does not exceed the late value, the output of inverter 201 is true which gates the late value through AND gate 203 to the OR gate 204 the output from 204 goes to comparator 52 through the lead 51. If the two input signals 50E and 50L are equal, a comparator 205 applies a signal to an AND gate 207 which in turn applies the early gate mean level 50E through the OR gate 204.

It is to be noted that for digital operation, each of the leads represented in the figures that would appropriately pass a plurality of bits, is a composite lead of a selected number of wires or conductors.

Thus there has been provided an improved clutter processor for radar data extraction that is substantially insensitive to the type of clutter that is encountered. Because clutter is substantially constant for relatively short range intervals the system of the invention looks at the amplitude of the clutter adjacent to and at a few range intervals from the on-time or potential target range bin to find the maximum mean clutter amplitude. The system utilizes in one arrangement in accordance with the invention, a set of parallel samples varying from minimum to maximum length in range for both early and late clutter as the sample with the largest mean value for the clutter amplitude is the one which has the longest range extent and this is the value that is utilized for the mean level for the detector threshold. The mean value is thus selected for both early and late clutter and the larger of the two or the one representing the longest sample interval may be the detector threshold. Thus, an accurate estimation of the mean value of the amplitude of any type of clutter is determined in accordance with the invention and a system is provided with the maximum detection sensitivity and a constant false alarm rate. Also in accordance with the invention in some arrangements, when more than one sample size has the same maximum mean value the detector responding to the sample size of the maximum range length is utilized to provide the most accurate means value for the threshold level. It is to be understood that the principles of the invention are equally applicable to systems utilizing a single mean level detection and selection arrangement and to systems utilizing both an early clutter and a late clutter mean level detection and selection arragement.

What is claimed is:

1. A clutter processor for providing a signal threshold and responding to a source of video signals, the source receiving the video signals over a range distance comprising:

an early and late plurality of detecting means coupled to said source of video signals, each early and late detecting means sampling over a range interval of a different time interval from the other range intervals of the corresponding early and late detecting means to form a plurality of sample intervals, each plurality being respectively before and after the time of occurrence of a video signal, each detecting means determining a signal related to the clutter amplitude, and signal selection means coupled to said early and late plurality of detecting means for selecting as a function of amplitude one of the signals from said early or late detecting means related to the clutter amplitude as a threshold so as to substantially match the corresponding sample interval to the range interval of clutter.

2. The combination of claim 1 in which said signal selection means selects the signal related to the clutter amplitude having the largest amplitude.

3. The combination of claim 2 in which the range intervals of said detection means each include a different number of range bin intervals, said detection means having range intervals selected to provide sample intervals from a predetermined minimum to a maximum range bin intervals and in which said signal selection means includes means to select a signal representative of clutter developed from the sample interval of the maximum range bin intervals when the amplitudes of signals representative of clutter are maximum and substantially equal for more than one sample.

4. The combination of claim 1 in which the plurality of detection means are a plurality of mean level detectors.

5. The combination of claim 4 in which said signal selection means includes early and late signal selection means each for selecting as a function of amplitude the largest signal from the corresponding early and late detecting means, and selection means coupled to said early and late signal selection means for selecting the largest signal therefrom as a threshold.

6. The combination of claim 4 further including storage means coupled to said plurality of mean level detectors and coupled to said source of video signals for providing signals over said range intervals of different time intervals to each of the mean level detectors.

7. The combination of claim 6 in which each of said mean level detectors include summing means coupled to said storage means and division circuit coupled between said summing means and said signal selection means to provide the signal related to the clutter amplitude.

8. A detection system responsive to signals received from objects over a plurality of range bin intervals in space having a clutter condition comprising:

delay means responsive to the received signals and providing an on time signal substantially from the center of the delay of said delay means, early and late detecting means each responsive to the received signal to develop a plurality of signals each representative of the clutter level over a different number of range bin intervals respectively before and after each on time signal, each first and second detecting means including selection means coupled to said plurality of detection means for selecting as a function of amplitude one of the signals representative of clutter level having a maximum amplitude, and early and late selection means coupled to the selection means of said first and second detection means for selecting the largest amplitude of the signals representative of clutter as selected by the selection means of said first and second detecting means as a detector threshold thus substantially matching the corresponding sample interval to the range interval of clutter.

* * * * *